(12) United States Patent
Burghardt

(10) Patent No.: US 11,783,381 B2
(45) Date of Patent: Oct. 10, 2023

(54) VISUAL INVENTORY RULES BUILDING SYSTEM

(71) Applicant: YAHOO AD TECH LLC, Dulles, VA (US)

(72) Inventor: Daryl Burghardt, San Francisco, CA (US)

(73) Assignee: YAHOO AD TECH LLC, New York, NY (US)

( * ) Notice: Subject to any disclaimer, the term of this patent is extended or adjusted under 35 U.S.C. 154(b) by 0 days.

(21) Appl. No.: 18/062,694

(22) Filed: Dec. 7, 2022

(65) Prior Publication Data

US 2023/0095022 A1    Mar. 30, 2023

Related U.S. Application Data

(63) Continuation of application No. 16/181,665, filed on Nov. 6, 2018, now Pat. No. 11,532,019.

(51) Int. Cl.
| | |
|---|---|
| *G06Q 30/00* | (2023.01) |
| *G06Q 30/0241* | (2023.01) |
| *G06F 3/04815* | (2022.01) |
| *G06F 3/04842* | (2022.01) |

(52) U.S. Cl.
CPC ..... *G06Q 30/0276* (2013.01); *G06F 3/04815* (2013.01); *G06F 3/04842* (2013.01)

(58) Field of Classification Search
None
See application file for complete search history.

(56) References Cited

U.S. PATENT DOCUMENTS

| | | |
|---|---|---|
| 10,782,864 B1 | 9/2020 | Hannebaum et al. |
| 2010/0169225 A1 | 7/2010 | Lymbery et al. |
| 2010/0174591 A1 | 7/2010 | DeAngelo |
| 2011/0107265 A1 | 5/2011 | Buchanan et al. |

(Continued)

FOREIGN PATENT DOCUMENTS

| | | | | |
|---|---|---|---|---|
| WO | WO-2008051807 A1 * | 5/2008 | ............. | G06Q 30/02 |
| WO | 2009018567 A1 | 2/2009 | | |
| WO | WO-2017124041 A1 * | 7/2017 | ......... | G06Q 30/0251 |

OTHER PUBLICATIONS

Edvardsen, Marcus, "Online Advertisement Management Program: OAMP," 44 pages (2006).

*Primary Examiner* — Michael Bekerman
(74) *Attorney, Agent, or Firm* — James J. DeCarlo; Greenberg Traurig, LLP

(57) ABSTRACT

Methods for creating and updating rules for distribution of an online advertising inventory. The methods can include generating a rule conditions section of a GUI that is configured to display a plurality of parameters of a rule condition of a rule for distribution of an online advertising inventory. Each displayed parameter of the rule condition can be graphically represented by a basic shape (e.g., a hexagon). And, each basic shape of the rule condition can be labeled with an alphanumerical indication of the graphically represented parameter and can also be clustered together in the GUI. The methods can also include generating a rule summary section of the GUI that is configured to display a plurality of rule conditions of a rule. The methods can also include generating a rules list section of the GUI that is configured to display a plurality of rules for distribution of inventory.

20 Claims, 7 Drawing Sheets

(56) References Cited

U.S. PATENT DOCUMENTS

| | | |
|---|---|---|
| 2012/0030074 A1 | 2/2012 | Rotenberg |
| 2013/0110614 A1 | 5/2013 | Wagner et al. |
| 2014/0032315 A1* | 1/2014 | Hall ................ G06Q 30/02 |
| | | 705/14.72 |
| 2014/0196081 A1 | 7/2014 | Emans et al. |
| 2015/0006277 A1 | 1/2015 | Delug |
| 2015/0025962 A1* | 1/2015 | Becket ............ G06Q 30/0272 |
| | | 705/14.48 |
| 2015/0121418 A1 | 4/2015 | Jain et al. |
| 2016/0125456 A1 | 5/2016 | Wu et al. |
| 2016/0189247 A1 | 6/2016 | Chester et al. |
| 2017/0208370 A1* | 7/2017 | Ray .................. H04N 21/266 |
| 2017/0300186 A1 | 10/2017 | Kuhar et al. |
| 2020/0019987 A1* | 1/2020 | Viola ................ G06F 40/30 |

\* cited by examiner

VISUAL INVENTORY RULES BUILDING SYSTEM

CROSS REFERENCE TO RELATED APPLICATIONS

This application is a continuation of, and claims priority from, co-pending U.S. patent application Ser. No. 16/181,665, filed Nov. 6, 2018, entitled Visual Inventory Rules Building System, the contents of which are hereby incorporated by reference.

COPYRIGHT PROTECTION

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to graphical user interfaces for creating and updating rules for distribution of an online advertising inventory.

BACKGROUND

Online advertising inventory is a space available to advertisers on digital platforms, such as space available to advertisers on news and entertainment websites.

Online ad inventory can be categorized into categories and can be purchased through a variety of sales channels, including online sales channels. The categories can include premium guaranteed, audience targeted, remnant, and sponsorships.

Also, online advertising inventory is increasingly being transacted algorithmically such as through real-time bidding (RTB).

For both large and small publishers and advertisers, inventory rules and pricing parameters are usually electronically displayed via grids and can be cumbersome. Also, such interfaces lack clarity. Creation of inventory rules and pricing can involve multiple parameters being combined in multiple steps or long forms with many attributes. Selected parameters are often summarized somehow in a sidebar. Some systems providing inventories for advertisers have a notion of "basic" and "advanced" workflows, which can still be difficult to use. Many user interfaces also allow both tile and/or grid views, but those user interfaces do not visually represent interdependencies among columns and grids nor do they easily show conflicts or relationships well.

SUMMARY

Described herein are technologies, implemented by one or more computing devices, for creating and updating rules for distribution of an online advertising inventory via a graphical user interface (GUI). Examples of the technologies and GUIs disclosed herein provide specific technical solutions to at least the problems mentioned herein as well as other technical problems not described herein but recognized by those of skill in the art. The technologies also provide for an enhanced user experience for customizing and monitoring online ad inventories. Some examples include a visual inventory rules building system for building inventory rules and for managing inventory pricing and monetization attributes (also referred to herein as the rules building system). The visual inventory rules building system allows at-a-glance association of objects and is potentially a new way to build and manage complex rules or deals to more easily monetize and maintain inventory. The rules building system is also a new way for users to easily make associations in a relational database that the contemporary user interfaces for inventory management do not provide. Many different graphical approaches have been tried, but none have been known to be as effective as the presently disclosed rules building system. Some examples of the GUI of the rules building system appear as a graphical chemistry set in which a user builds molecular like graphics representative of simple or complex inventory management rules. The graphics representing the rules or parts of rules can be in two or three dimensions.

The visual inventory rules building system can allow end users to easily select items and quickly understand the overall strategy they are employing for inventory rules at auction. The GUI of the rules building system can provide for a user to switch between a quick visual mode, an advance mode and a more conventional view mode. Through GUI oriented validation, the rules building system can also be used to flag items that may not be compatible and/or successful. Such validation can be used to exclude inventory areas such as excluding a certain type of audience member or a certain type of device demographic. Also, replacement inventory areas can be suggested by the rules building system. This can make enhancing an inventory much simpler that optimization through conventional user interfaces for inventory management.

Benefits of the visual inventory rules building system include GUI interactions that can be used for ad inventory configuration and campaign creation. Also, the rules building system can provide for easy to understand pricing parameters around an ad placement deal. The rules building system can also provide for easy visualization of conflicts in an inventory rule that exists or in the building process of a rule. Also, with the visual inventory rules building system, a user can simply compare differences between different rules and pricing configurations. And, suggestions from the computing device running the rules building system can easily provide opportunities and suggestions in the building a rule GUI. Suggestions, conflicts, opportunities, and the like can be emphasized with simple shape, color, and animation schemes. Complex relationships can also be provided at-a-glance. And, the rules building system can be adapted for augmented reality and virtual reality systems. Because of the simple visual aspects of the visual inventory rules building system, the aspects can be easily translated into three dimensions for augmented reality and virtual reality systems. Also, adapting the rules building system to voice input may be easier then with adapting such input to contemporary inventory management systems. Some embodiments can use voice input to create and update rules.

In general, within the online advertising industry, most user interfaces rely upon grids and multiple inputs or selections to build rules, and the relationships of these items together are usually not clear to an end user. The visual inventory rules building system simplifies both selection and comprehension of a rule or inventory object's creation. The rules building system can also provide for easy creation of new rules or parts of rules, adding pricing to the rules and parts, and assembling or adding attributes. The addition and/or assembly of attributes can be done automatically in a progressive way. This automation can also include breaks in the progression of adding and/or assembling attributes for end user feedback and interaction. The rules building system can also provide for analyzing efficacy of rules and for identifying and resolving conflicts in the rules. Finally, after creation of a rule, the rules building system can provide saving and implementation of the rule in an online advertising space. Success of parts of the rule can then be monitored through the same visual design of the rule creation GUI. The rules building system can also provide for cloning rules and updating attributes of original and cloned rules.

In accordance with one or more embodiments, this disclosure provides computerized methods for creating and updating rules for distribution of an online advertising inventory via a GUI as well as a non-transitory computer-readable storage medium for carrying out technical steps of the methods. The non-transitory computer-readable storage medium has tangibly stored thereon, or tangibly encoded thereon, computer readable instructions that when executed by one or more devices (e.g., server, client device, and the like) cause at least one processor to perform the aspects of the visual inventory rules building system.

In accordance with one or more embodiments, a system is provided that includes one or more computing devices configured to provide functionality in accordance with one or more embodiments of a novel and improved method, implemented by one or more computing devices, for creating and updating rules for distribution of an online advertising inventory via a GUI.

In accordance with one or more embodiments, functionality is embodied in steps of a method performed by at least one computing device. In accordance with one or more embodiments, program code (or program logic) executed by processor(s) of a computing device to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
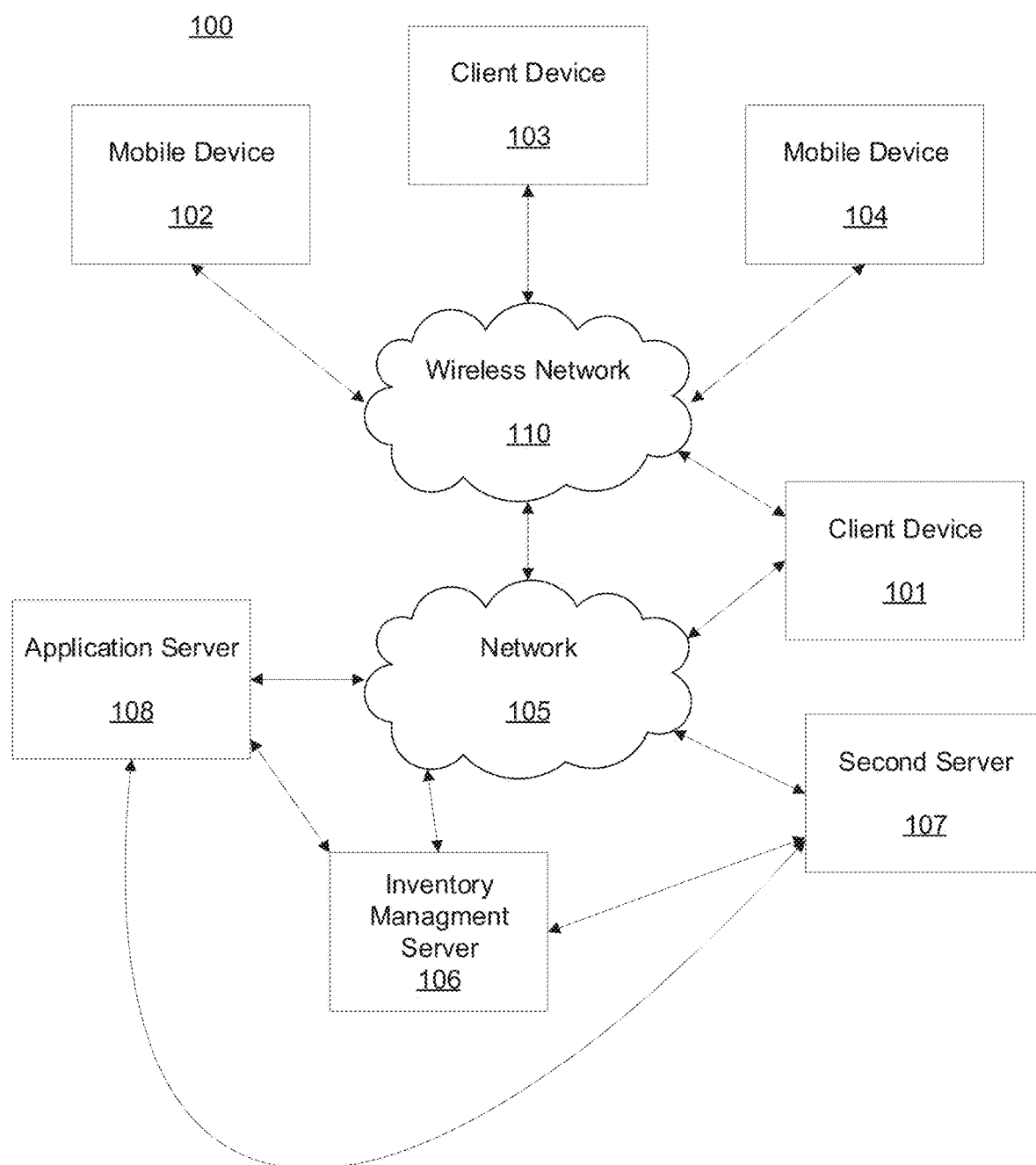
FIG. 1 is a schematic diagram illustrating an example of a network within which systems and methods disclosed herein can be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/ acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium can include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ standalone adhoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, an NFC device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

For purposes of this disclosure, a mobile device is or includes a client device that is small enough to be held and operated by one or two hands of a person. In some examples, a mobile device has a touchscreen interface with digitally derived buttons and keyboard or physical buttons along with a physical keyboard or keypad. A mobile device can connect to the Internet and interconnect with other devices such as an Internet of Things (IoT) device or another type of network connected device via Wi-Fi, Bluetooth, cellular networks or near field communication (NFC). A camera and other types of sensors, as well as digital media players and parts of a Global Positioning System (GPS) can be included in a mobile device. Power can be provided to a mobile device by a battery or other wireless power source such a solar power source. A mobile device can run a mobile operating system that allows third-party mobile applications such as applications from a same vendor to be installed and run on the mobile device.

In some embodiments, the mobile applications described herein can include one or more advertisements. For purposes of this disclosure, an advertisement should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item includes content relaying promotional content provided by a network associated party.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (e.g., handheld client devices) 102 and 104, and client devices 101 and 103. FIG. 1 additionally includes a variety of servers, such as an inventory management server 106, a second server 107 (which could be secondary inventory management server or an ad server solely or combined with another type of server such as an application server or a content server), and an application (or "App") server 108. Each of the servers can be considered a remote server with respect to the client devices and the mobile devices illustrated in FIG. 1.

Figure 2:
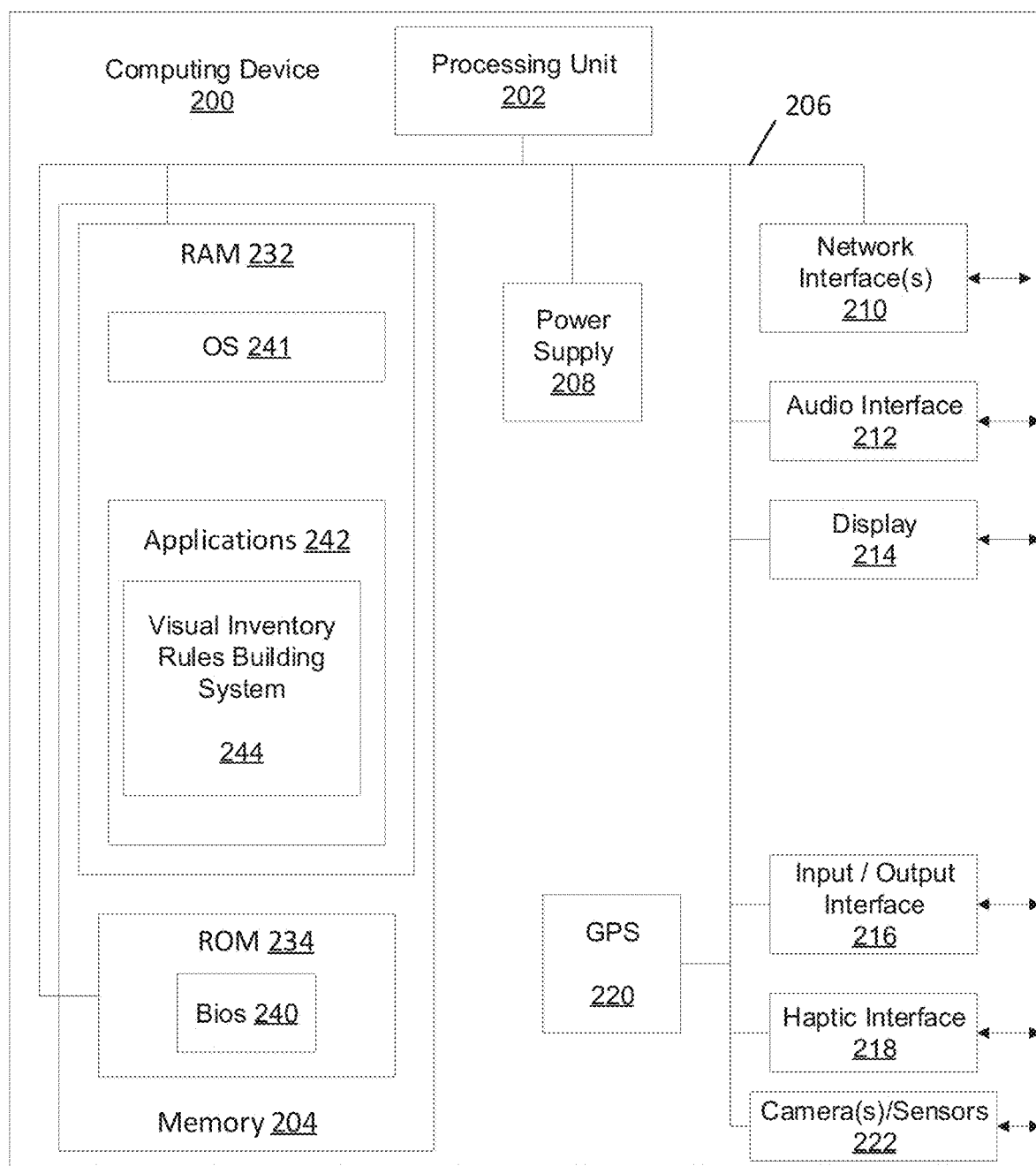
FIG. 2 depicts is a schematic diagram illustrating an example of a computing device in accordance with some embodiments of the present disclosure.
Figure 5:
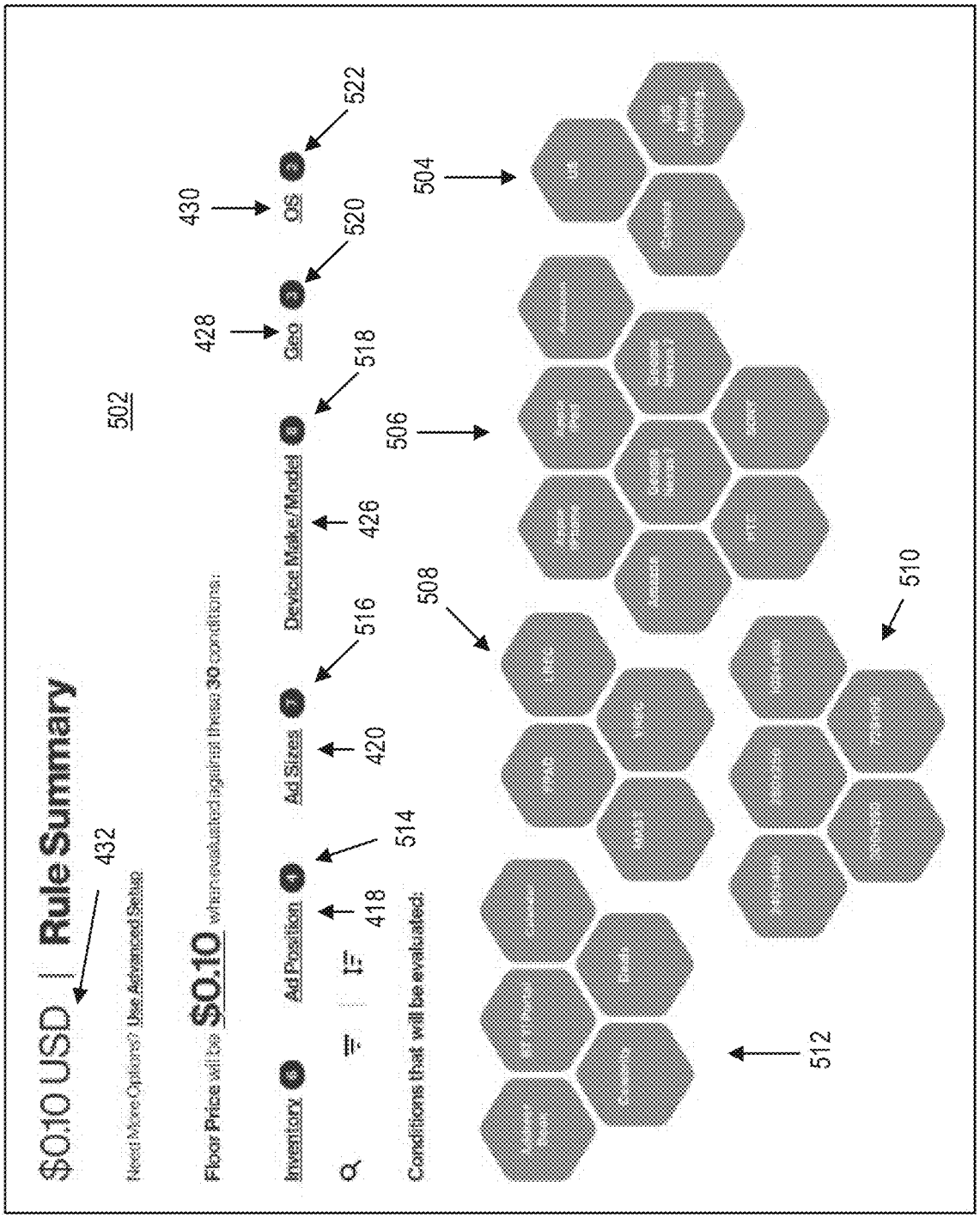
FIG. 5 is an illustration of a screenshot of an example rule summary section of the GUI in accordance with some embodiments of the present disclosure.
Figure 6:
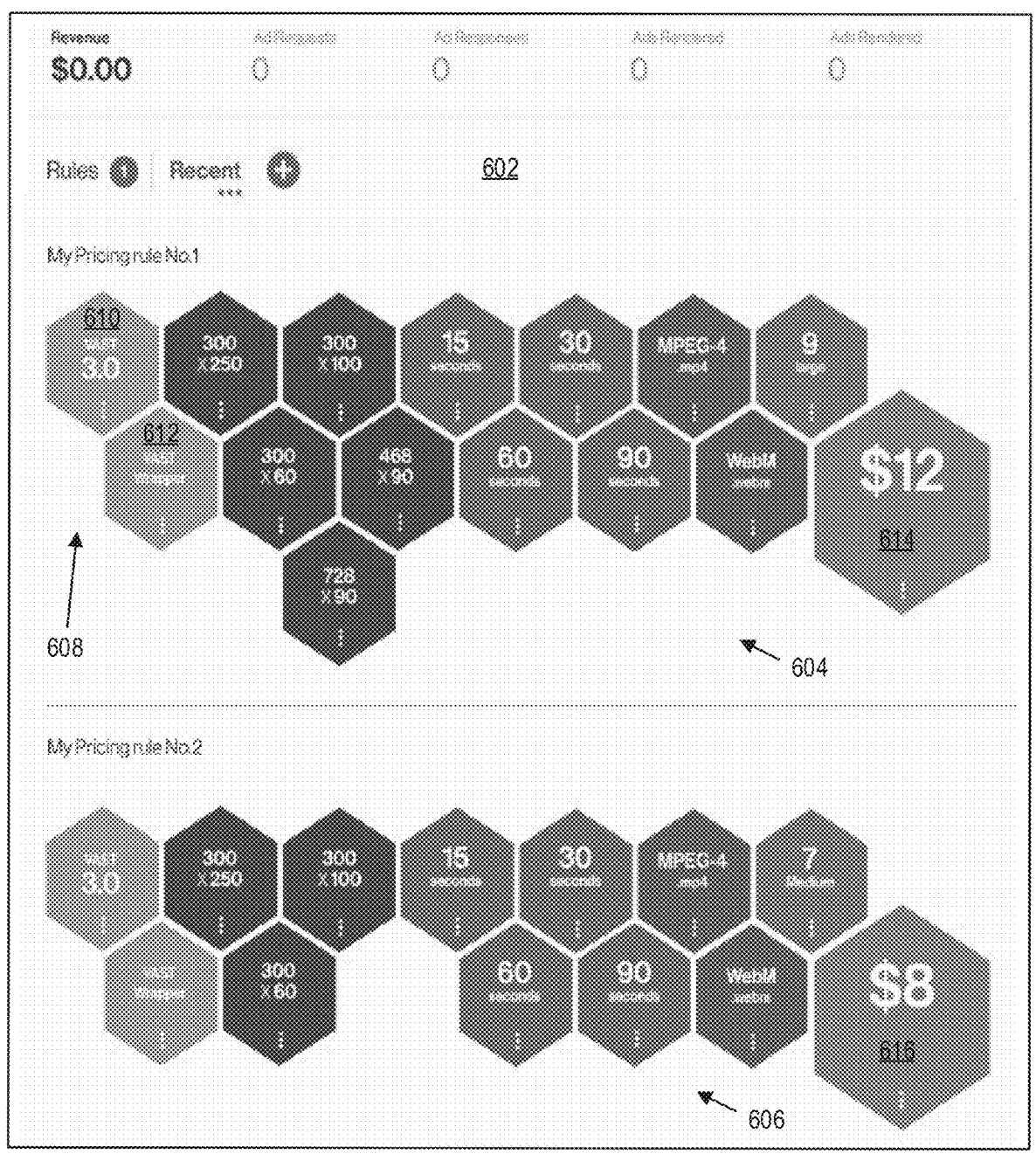
FIG. 6 is an illustration of a screenshot of an example rules list section of the GUI in accordance with some embodiments of the present disclosure.

Each of the devices 101, 102, 103, and 104 can include components for receiving, processing, and displaying the GUI of the visual inventory rules building system (such as the visual inventory rules building system 244 depicted in FIG. 2) as well as sections of the GUI, such as the rule conditions section (e.g., see FIG. 4), rule summary section (e.g., see FIG. 5), and the rules list section (e.g., see FIG. 6).

Figure 3:
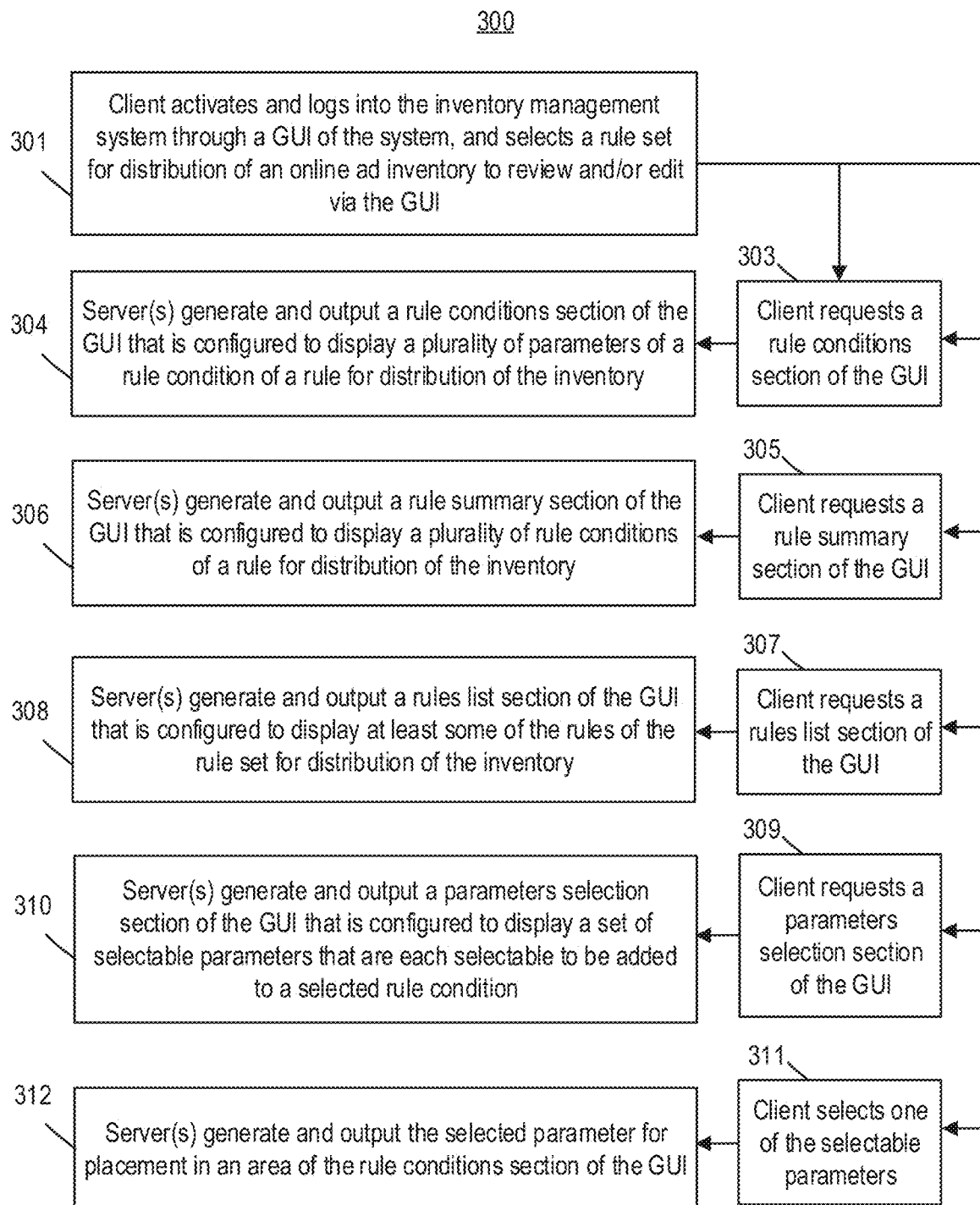
FIG. 3 is a flowchart illustrating operations that can be performed by one or more computing devices running aspects of the visual inventory rules building system in accordance with some embodiments of the present disclosure.

The inventory management server 106 and/or the second server 107 can include one or more devices that include a configuration to implement the visual inventory rules building system (such as the rules building system 244) and to perform at least some of the operations of process 300 of FIG. 3.

The servers 106, 107, and 108 and the client devices 101 and 103 will be described below in greater detail after the following description of the mobile devices 102 and 104.

Generally, mobile devices 102 and 104 may include virtually any portable computing device capable of receiving and sending a message over a network, such as network 105, wireless network 110, or the like. Mobile devices 102 and 104 may also be described generally as client devices that are configured to be portable. Thus, mobile devices 102 and 104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102 and 104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 and 104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 and 104 may uniquely identify themselves through any of a variety of mechanisms, including a phone number, Mobile Identification Number (MIN), an electronic serial number (ESN), or another mobile device identifier.

In some embodiments, mobile devices 102 and 104 may also communicate with non-mobile client devices, such as client devices 101 and 103, or the like. In one embodiment, such communications may include sending and/or receiving messages, searching for, viewing and/or sharing photographs, audio clips, video clips, or any of a variety of other forms of communications. client devices 101 and 103 can include virtually any non-mobile computing device capable of communicating over a network to send and receive information. The set of such devices may also include devices that typically connect using a wired or wireless communications medium such as personal computers, multiprocessor systems, microprocessor-based or programmable consumer electronics, network PCs, or the like. The IoT devices 101 and 103 and the set of devices overall may also have differing capabilities for displaying navigable views of information from that of the mobile devices.

In general, devices 101, 102, 103, and 104 may be capable of sending or receiving signals, such as via a wired or wireless network, or may be capable of processing or storing signals, such as in memory as physical memory states, and may, therefore, operate as a server.

Wireless network 110 is configured to couple devices 101, 102, 103, and 104 and their components with network 105. Wireless network 110 may include any of a variety of wireless sub-networks that may further overlay stand-alone ad-hoc networks, and the like, to provide an infrastructure-oriented connection for devices 101, 102, 103, and 104. Such sub-networks may include mesh networks, Wireless LAN (WLAN) networks, cellular networks, and the like.

Network 105 is configured to couple severs 106, 107, and 108, or the like, with other computing devices, including, devices 101, 102, 103, and 104, and through wireless network 110 to devices 101, 102, 103, and 104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communicate with other members of a social network via a variety of devices. Multi-modal communication technologies refer to a set of technologies that permit interoperable communication across multiple devices or platforms, such as IoT devices, cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 can include a content distribution network(s). A "content delivery network" or "content distribution network"

(CDN) generally refers to a distributed content delivery system that includes a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

As mentioned herein, the inventory management server 106 and/or the second server 107 can include a device that includes a configuration to perform at least some of the operations of process 300.

The application server 108 and/or the second server 107 can include a device that includes a configuration to provide content such as interactive content via a network to another device. Such server(s) may, for example, host a site, service or an associated application, such as, an email platform (e.g., Yahoo!® Mail), a social networking site, a photo sharing site/service (e.g., Tumblr®), a search platform or site, or a personal user site (such as a blog, vlog, online dating site, and the like) and the like. Such server(s) may also host a variety of other sites, including, but not limited to business sites, educational sites, dictionary sites, encyclopedia sites, wikis, financial sites, government sites, and the like. Devices that may operate as such server(s) include personal computers desktop computers, multiprocessor systems, microprocessor-based or programmable consumer electronics, network PCs, servers, and the like.

The application server 108 and/or the second server 107 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical signals, for example.

Also, the application server 108 and/or the second server 107 can include an ad server such as a server that stores online advertisements for presentation to users. "Ad serving" provided by an ad server refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available. Such functionality can be provided by at least one of the servers 107 and 108.

Servers 106, 107, and 108 can be capable of sending or receiving signals, such as via a wired or wireless network, or can be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 107, and/or 108. This may include in a non-limiting example, authentication servers, search servers, email servers, social networking services servers, SMS servers, IM servers, MMS servers, exchange servers, photo-sharing services servers, and travel services servers, via the network 105 using devices 101, 102, 103, and 104. In some embodiments, applications, such as a mail or messaging application (e.g., Yahoo!® Mail, Yahoo!® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by the application server 108 (or a second server 107 such as one include a content server, message server and the like). Thus, the application server 108 can store various types of applications and application related information including application data and user profile information (e.g., identifying and behavioral information associated with a user). It should also be understood that server 107 can also store various types of data related to the content and services provided by server 107 in an associated database. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 107, and 108.

Moreover, although FIG. 1 illustrates servers 106, 107, and 108 as single computing devices, respectively, the disclosure is not so limited. For example, one or more functions of servers 106, 107, and 108 may be distributed across one or more distinct computing devices. Moreover, in one embodiment, servers 106, 107, and/or 108 may be integrated into a single computing device, without departing from the scope of the present disclosure.

FIG. 2 is a schematic diagram illustrating a computing device 200 that can implement any one or more of the devices 101, 102, 103, and 104 and/or servers 106, 107, and 108. The computing device 200 can include a configuration to perform at least some of the operations described herein, such as operations performed in FIG. 3 when implementing a client device or a server. Computing device 200 may include many more or less components than those shown in FIG. 2. However, the components shown are sufficient to disclose an illustrative embodiment for implementing some aspects the present disclosure.

As shown in the figure, device 200 includes a processing unit 202 (which can include one or more CPUs) in communication with a mass memory 204 via a bus 206. Computing device 200 also includes a power supply 208, one or more network interfaces 210, an audio interface 212, a display 214 (such as a touchscreen), an input/output interface 216, a haptic interface 218, a global positioning system (GPS) receiver 220 as well as one or more cameras or other types of sensors 222. Network interface(s) 210 can include circuitry for coupling device 200 to one or more networks, and is constructed for use with one or more communication protocols and technologies as discussed above. Network interface(s) 210 is sometimes known as a transceiver, transceiving device, or network interface card (NIC). Audio interface 212 is arranged to produce and receive audio signals such as the sound of a human voice. Display 214 can include any type of display used with a computing device. Display 214 can also include a touch sensitive screen. The input/output interface 216 can include a keypad or any other input device arranged to receive input from a user. The input/output interface 216 can also implement communications with external devices, such as a headset, or other input or output devices such physical IoT devices. Input/output interface 216 can utilize one or more communication technologies, such as USB, infrared, or Bluetooth™. Haptic interface 218 is arranged to provide tactile feedback to a user of the device 200.

Mass memory 204 includes a RAM 232, a ROM 234, and other storage means. Mass memory 204 illustrates another example of computer storage media for storage of information such as computer readable instructions, data structures, program modules or other data. Mass memory 204 stores a basic input/output system ("BIOS") 240 for controlling low-level operation of device 200. The mass memory also stores an operating system 241 in RAM 232 for controlling the operation of device 200.

Memory 204 further includes one or more data stores, which can be utilized by device 200 to store data in general, among other things, as well as the modules, data, and data structures described herein. For example, data stores can be employed to store information that describes various capabilities of device 200 and input and outputs of process 300 of FIG. 3. Applications 242, such as applications provided by the servers 106, 107, and 108 and/or clients devices 101, 102, 103, and 104, can include computer executable instructions which, when executed by device 200 (and more specifically by processing unit 202), transmit, receive, or otherwise process text, audio, video, images, or enable communications with another computing device. As shown, the applications 242 can include visual inventory rules building system 244. The rules building system 244 can include executable logic or instructions for creating and updating rules for distribution of an online advertising inventory via a GUI. For example, the rules building system 244 can include logic or instructions for process 300 illustrated in FIG. 3.

Other examples of application programs or "apps" in some embodiments include browsers, calendars, contact managers, task managers, transcoders, photo management, database programs, word processing programs, security applications, spreadsheet programs, games, search programs, and so forth. An application, such as the applications, functions, and modules described herein can include a search client that is configured to send, to receive, or to otherwise process a search query or search result using any known or foreseeable communication protocols. The applications disclosed herein can be combinable with at least each other.

Turning to FIG. 3, process 300 details steps performed by one or more computing devices in accordance with some embodiments of the present disclosure for creating and updating rules for distribution of an online advertising inventory via a GUI. In some embodiments, process 300 can be performed by the visual inventory rules building system (such as the rules building system 244), which can include server and client components (such as separate server and client devices). The rules building system can also be or include software running on any one or more of the client devices and servers depicted in FIG. 1.

Process 300 begins with step 301, which includes a client component activating and logging into the rules building system through a GUI of the system. Also, through the GUI and user input, the client selects a rule set for distribution of an online ad inventory to review and/or edit via the GUI. Also, an end user can select to create a new rule set for distribution of an online ad inventory.

In step 303, the client component requests a rule conditions section of the GUI to create or update a rule condition for a rule for distribution of an online advertising inventory.

Figure 4:
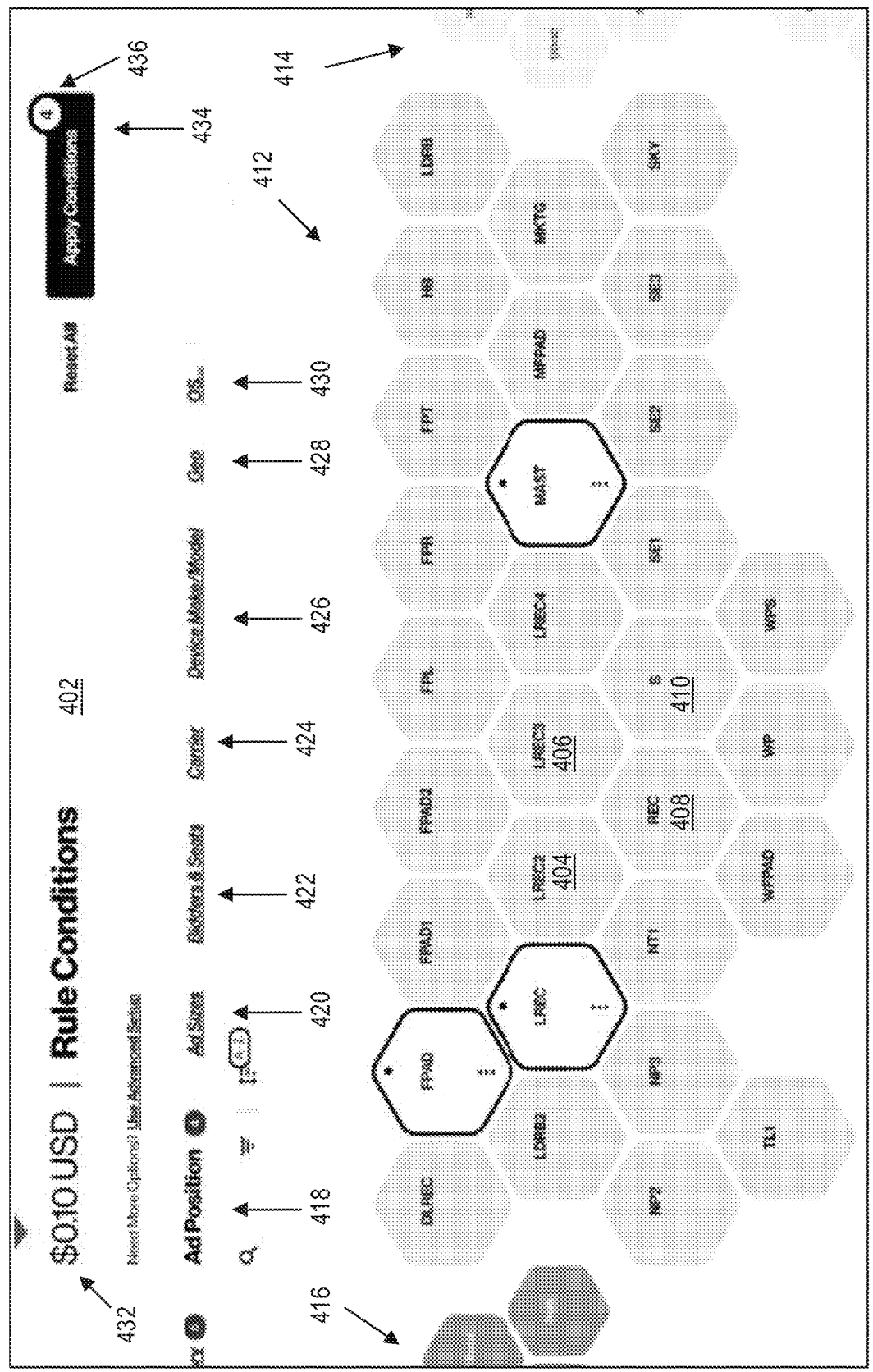
FIG. 4 is an illustration of a screenshot of an example rule conditions section of a GUI of the rules building system in accordance with some embodiments of the present disclosure.

In step 304, in response to step 303, the server component generates a rule conditions section of the GUI that is configured to display a plurality of parameters of a rule condition of a plurality of rule conditions of a rule of a plurality of rules for distribution of an online advertising inventory (e.g., see rule conditions section 402 depicted in FIG. 4). Each displayed parameter of the rule condition can be graphically represented by a basic shape in the GUI (e.g., see the hexagons depicted in the rule conditions section 402). And, each basic shape of the rule condition can be labeled in the GUI with an alphanumerical indication of the graphically represented parameter (e.g., see the hexagons depicted in section 402). Also, each basic shape can be clustered together in the GUI such that each basic shape of the rule condition is connected graphically with at least one other basic shape of the rule condition (e.g., see the hexagons depicted in section 402). In FIG. 3, it is specifically shown that in step 304 the server component generates and outputs a rule conditions section of the GUI that is configured to display a plurality of parameters of a rule condition of a rule for distribution of the inventory.

Each parameter of the plurality of parameters can be associated with a rule condition category. Rule condition categories can include ad position, ad size, carrier preference, device make and model preference, geographic preference, and operating system preference.

Each basic shape of the rule condition can be connected graphically with at least one other basic shape of the rule condition by being directly next to the at least one other basic shape without any other shape of the rule condition positioned between the two basic shapes (e.g., see basic shapes 404 and 406 depicted in the rule conditions section 402 in FIG. 4). Each basic shape of the rule condition can be a regular polygon (e.g., see basic shapes 404 and 406), and a side of each basic shape of the rule condition can face only one side of another one of the basic shapes of the rule condition directly (e.g., see basic shapes 404 and 406). Also, the facing sides can be orthogonal to each other (e.g., see basic shapes 404 and 406). In some embodiments, the end points of the lines of the sides facing each other can be aligned with each other such that neither one of the lines of the facing sides extends past the other (e.g., see basic shapes 404 and In some embodiments, each basic shape of the rule condition is connected graphically with at least one other basic shape of the rule condition by abutting the at least one other basic shape (not depicted). In such embodiments, each basic shape of the rule condition can be a regular polygon, and the abutting of one of the basic shapes to another basic shape of the rule condition can include the abutting sides of the abutting shapes being orthogonal to each other. And, in such embodiments, the end points of the lines of the sides abutting each other can be aligned with each other such that neither one of the lines of the abutting sides extends past the other.

In some embodiments, each basic shape of the rule condition can be connected graphically with at least one other basic shape of the rule condition by a connector graphic (not depicted). In such embodiments, each connector graphic can be a straight line and each basic shape of the rule condition is a circle such that the cluster is similar in appearance to a two-dimensional depiction of a molecule. Also, each connector graphic can be a three-dimensional depiction of a straight wire, and each basic shape of the rule condition can be a sphere such that the cluster is similar in appearance to a three-dimensional depiction of a molecule. In such embodiments, the cluster of basic shapes of the rule condition can be depicted three-dimensionally.

In step 305, the client component requests a rule summary section of the GUI to view, update, or create a rule for distribution of an online advertising inventory.

In step 306, in response to step 305, the server component generates a rule summary section (e.g., see rule summary section 502 depicted in FIG. 5) of the GUI that is configured to display a plurality of rule conditions of a rule of the plurality of rules (e.g., see rule conditions 504, 506, 508, 510, and 512 depicted in the rule summary section 502). The displaying of the plurality of rule conditions can include displaying at least some of parameters of each rule condition of the plurality of rule conditions (e.g. see the parameters of each rule condition being represented as hexagons in the rule summary section 502). In some embodiments, the displaying of the plurality of rule conditions can include displaying all parameters of each rule condition of the plurality of rule conditions of a rule. In FIG. 3, it is specifically depicted that in step 306 the server component generates and outputs a rule summary section of the GUI that is configured to display a plurality of rule conditions of a rule for distribution of the inventory.

In some embodiments, the displaying of the plurality of the rule conditions in the rule summary section of the GUI can include displaying each of the plurality of parameters of each rule condition of the plurality of rule conditions of the rule.

In step 307, the client component requests a rules list section of the GUI to possibly select a rule for viewing, updating, or removing from the rules of distribution of an online advertising inventory.

In step 308, in response to step 307, the server component generates a rules list section (e.g., see rules list section 602 depicted in FIG. 6) of the GUI that is configured to display at least some of the plurality of rules (e.g., see rules 604 and 606 depicted in the rules list section 602). The displaying of the at least some of the plurality of rules can include displaying at least some of the plurality of rules conditions of each rule displayed (e.g., see rule condition 608 which is depicted as having at least parameters 610 and 612). In FIG. 3, it is specifically depicted that in step 308 the server component generates and outputs a rules list section of the GUI that is configured to display at least some of the rules of the rule set for distribution of the inventory.

Each rule of the plurality of rules can include a pricing parameter (e.g., see pricing parameters 614 and 616 of rules 604 and 606 depicted in FIG. 6).

In some embodiments, the rule conditions section and the rule summary section of the GUI are displayed at different times. Also, alternatively, the rule conditions section and the rule summary section of the GUI can be displayed at the same time.

In step 309, the client component requests a parameters selection section of the GUI so that an end user can select one or more parameters to add to a rule condition.

In step 310, in response to step 309, the server component generates a parameters selection section of the GUI that is configured to display a set of selectable parameters that are each selectable to be added to a selected rule condition of a plurality of rule conditions of a rule of the plurality of rules. And, the parameters selection section of the GUI is configured to, upon selection of one of the selectable parameters by a user, display the selected parameter in an area of the rule conditions section separate from the plurality of parameters of the rule condition or as part of the cluster of the plurality of parameters. In FIG. 3, it is specifically depicted that in step 310 the server component generates and outputs a parameters selection section of the GUI that is configured to display a set of selectable parameters that are each selectable to be added to a selected rule condition. In some embodiment, the selected parameter is moveable to different parts of the cluster from within rule conditions section. To put it another way, each of the basic shapes is moveable to different parts of the cluster from within the section by a user interacting with the section. Also, each of the basic shapes or parameters is removeable from the cluster by a user interacting with the section and thus the corresponding parameter is removable from the rule condition from a user interacting with specific parts of the GUI. And, in some embodiments, the position of a parameter in the cluster is associated with a certain priority or weight relative to other parameters in the cluster.

In step 311, the client component selects, such as via a user input, one of the selectable parameters. In step 312, in response to step 311, the server component generates and outputs the selected parameter for placement in an area of the rule conditions section of the GUI.

FIG. 4 is an illustration of a screenshot of an example rule conditions section 402 of a GUI of the visual inventory rules building system in accordance with some embodiments of the present disclosure. The rule conditions section 402 includes a plurality of parameters (e.g., parameters 404, 406, 408, and 410) of rule condition 412 of a plurality of rule conditions of a rule of a plurality of rules for distribution of an online advertising inventory. Rule conditions 414 and 416 are shown partially in the rule conditions section 402 and belong to the same rule as rule condition 412. Rule conditions 414 and 416 are also shown as being next to rule condition 412 but not clustered with rule condition 412.

The graphical arrangement of rule conditions 412, 414, and 416 can mean that the rule condition 412 is related to rule conditions 414 and 416 in some way and/or rule condition 412 has a priority in-between rule conditions 414 and 416. To put it another way, the arrangement of rule conditions with respect to each other in a rule can correspond to relationships between conditions and/or priority of the conditions. The same applies to parameters of a rules condition as well.

FIG. 4 also depicts a plurality of selectable rule condition categories (e.g. selectable rule condition categories 418, 420, 422, 424, 426, 428, and 430) in the rule conditions section 402. Each parameter of the plurality of parameters of a rule condition is associated with a rule condition category. In some embodiments, the parameters of a rule condition belong to the same category. Also, a rule condition can have parameters of different categories. In such examples, similar categorized parameters can be clustered together within the rule condition.

As shown, the selectable ad position category 418 has been selected (which is shown by the corresponding text being bolded relative to the other selectable rule condition categories 420, 422, 424, 426, 428, 430). The categories 420, 422, 424, 426, 428 and 430 are unselected, but selectable. Selection of a category in the rule conditions section 402 causes one or more corresponding rule conditions of that category to appear in the rule conditions section 402. For example, as shown, rule condition 412 appears in the rule conditions section 402 because at least some of its parameters are associated with ad position, and thus associated with the selectable ad position category 418. The selectable ad size category 420, the selectable bidders and seats category 422, the selectable carrier preference category 424, the selectable device make and model preference category 426, the selectable geographic preference category 428, and selectable operating system preference category 430 are shown in the rule conditions section 402 as well.

FIG. 4 also depicts the pricing parameter 432 of the rule having rule condition 412. Not depicted is an indication of the one or more rules having rule condition 412. This can be included in some embodiments of the rule conditions section 402. Shown is a selectable field 434 for applying the rule condition 412 to a rule. In that field is a sub-field 436 that indicates the number of rules that include the rule condition 412. Also, not shown, is a selectable field for presenting the one or more rules that include a rule condition such as rule condition 412. This field can also be in the rule conditions section 402 in some embodiments and can indicate the number of rules linked to the displayed rule condition.

FIG. 5 is an illustration of a screenshot of an example rule summary section 502 of the GUI in accordance with some embodiments of the present disclosure. Depicted are the rule conditions 504, 506, 508, 510, and 512 of the rule visually presented in the rule summary section 502. In some embodiments, all the rule conditions and their parameters are shown in the rule summary section. This is not the case in rule summary section 502 due to the layout size of the rule summary section. In some embodiments, low priority rule conditions and parameters may not be shown in the rule summary section, depending on the space available in the section. Higher priority elements can be added to the section by the rules building system until space is not available in the section.

Also, depicted in the section 502 is the pricing parameter 432 of the rule. The pricing parameter 432 can be representative of the floor of pricing for bidding on inventory under the rule. The pricing parameter in some embodiments can be representative of the ceiling of pricing for bidding on inventory under the rule. There can also be pricing parameters for the floor and ceiling.

In addition to the rule depicted by its rule conditions 504, 506, 508, 510, and 512, also depicted in the rule summary section 502 are indications 514, 516, 518, 520, and 522 of the number of parameters belonging to rule condition categories for the rule. The indications 514, 516, 518, 520, and 522 show how many parameters of a condition category occur in a rule. Also, the selectable ad position category 418, the selectable ad size category 420, the selectable device make and model preference category 426, the selectable geographic preference category 428, and selectable operating system preference category 430 are shown in the rule summary section 502 as well. The selectable categories can be selected by a user to zoom into the rule conditions section corresponding to the selected category. For example, selecting the selectable ad position category 418 can cause the GUI to activate a rule conditions section associated with ad position category such as section 402 shown in FIG. 4. Ad position parameter amount indication 514, ad size parameter amount indication 516, device make and model preference parameter amount indication 518, geographic preference parameter amount indication 520, and operating system preference parameter amount indication 522 for the rule are shown in the rule summary section 502 as well.

FIG. 6 is an illustration of a screenshot of an example rules list section 602 of the GUI in accordance with some embodiments of the present disclosure. As shown the rules list section 602 includes rules 604 and 606, respective rule conditions of the rules (e.g., rule condition 608), and respective parameters of the rule conditions (e.g., parameters 610 and 612 of rule condition 608 of rule 604). Also, FIG. 6 depicts pricing parameters 614 and 616 of rules 604 and 606 respectively. The pricing parameters 614 and 616 represent the floor of pricing for bidding on inventory under the rules 604 and 606 respectively. The pricing parameter in some embodiments can be representative of the ceiling of pricing for bidding on inventory under a rule. There can also be multiple pricing parameters for the floor and ceiling under a rule.

Figure 7:
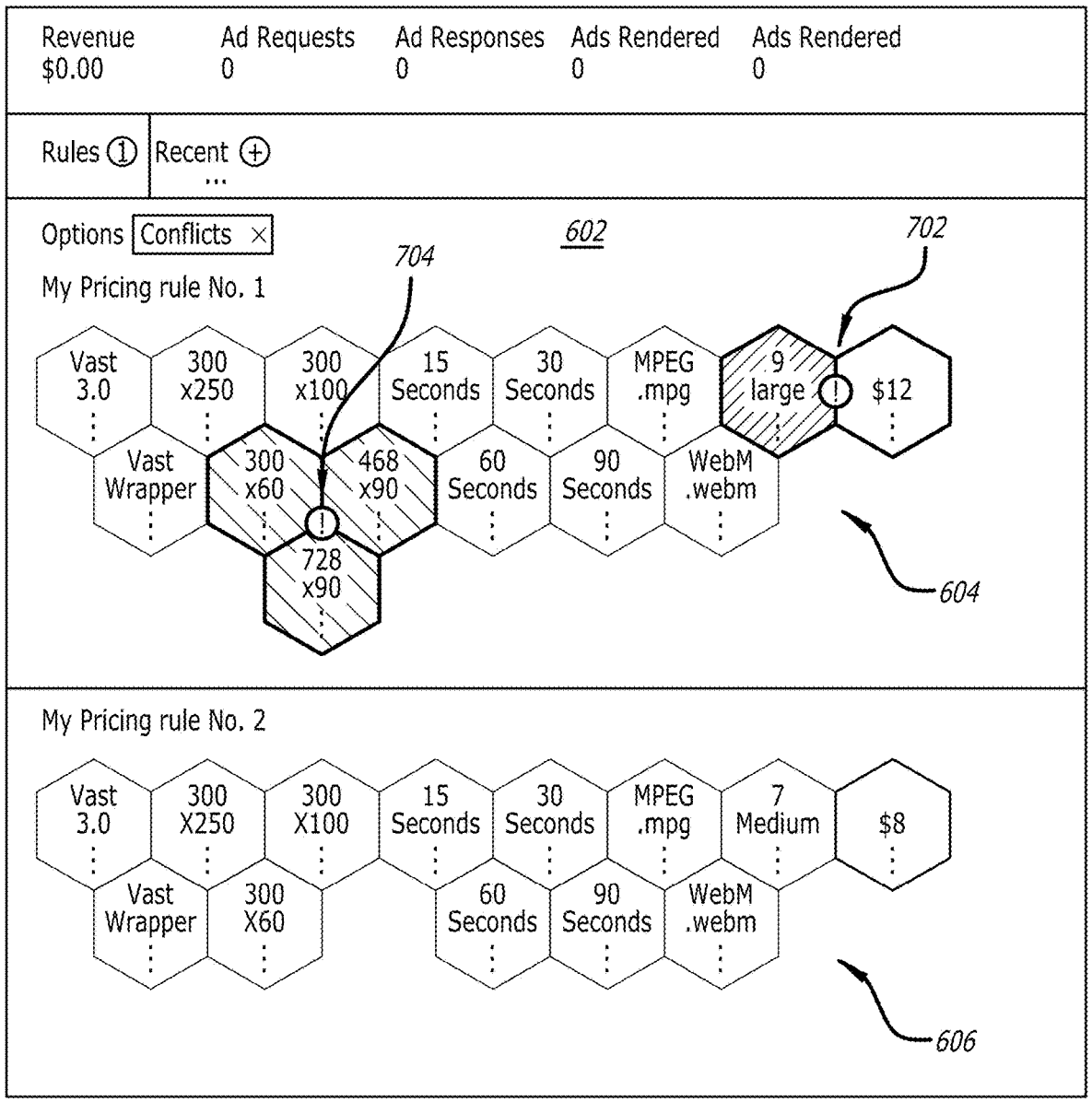
FIG. 7 is an illustration of another screenshot of the example rules list section of the GUI in accordance with some embodiments of the present disclosure.

FIG. 7 is an illustration of another screenshot of the example rules list section 602 of the GUI in accordance with some embodiments of the present disclosure. Similarly, the section 602 includes rules 604 and 606 in the view of FIG. 7. However, one or more compatibility issues between parameters of the rules are indicated by compatibility issue indicators 702 and 704. Validation logic and analysis via visual rules can be shown via different view options. For example, a rules analysis prediction mode or optimization mode can have different views of the same section of the GUI. As shown in FIG. 7, the section 602 is shown, which is the same section shown in FIG. 6, but a different view is depicted in FIG. 7 of the section. The view depicted in FIG. 7 is an incomplete, incorrect, and/or sub-optimal configurations view that is indicating via the indicators 702 and 704 where incomplete, incorrect, and/or sub-optimal arrangement of parameters are occurring within rule 604. Not depicted, logic or instructions for determining and outputting suggestions for remedying the issues can be a part of the visual inventory rules building system as well.

The view depicted in FIG. 7 or a similar view can be modified to provide modeling of parameters of rules, such as simulation for pricing parameters. Such modeling via a simulation can reveal more effective configurations. And, different configurations can be simulated simply by swapping parameters of rules within the rules list section. Simulations and reconfiguring of the rules and rule conditions can also occur through the other sections of the GUI disclosed herein such as sections 402 and 502.

Conflicts and dependencies can also be indicated through the sections of the GUI disclosed herein. This can occur via user interface validation during the building process of rules and rule conditions (such as via sections 402 and 502) or at the summary stage (such as via section 602). Dependencies between parameters and between rules conditions can also be evaluated against the whole rule and each other.

In a validation mode, sub-optimal arrangements of parameters can be reduced by limiting user interface interactions with the GUI, such as by limiting the insertion of incomplete, incorrect, and/or sub-optimal parameter combinations for a given rule. Also, historical data on arrangement of rules can be a factor used by the visual inventory rules building system to determine incomplete, incorrect, and/or sub-optimal parameter combinations for a given rule. Also, visual rule comparisons can indicate differences to be analyzed and assist in elimination of redundancies in auction logic and other aspects of a rule. In indications of issues, the rules building system can use real-time bidding (RTB) priority, range overlap, and pricing to evaluate rules for disparity among all constituent parts. Also, aggregated data can show the usage, efficacy, and/or impact of a rule over time (such as its usage, efficacy, and/or impact in an auction). This can be exposed within the GUI in real-time or using historical data in a simulation to improve future usage and/or cloning of rules. This can also reveal inventory configuration improvements.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
generating, by a computing device, a graphical user interface (GUI) that is configured to display, in connection with a set of rules, online advertising space inventory distribution rule information;
receiving, by the computing device, via the GUI, a request for a display of a rule summary section for a rule of the set of rules;

generating, by the computing device, in response to the request, a rule summary section of the GUI that is configured to display a summary of the rule, the rule summary section comprising a set of controls, each control corresponding to a rule condition category of a set of rule condition categories, and being selectable by a user of the GUI to navigate to a rule conditions section of the GUI to view at least one rule condition for the rule;

receiving, by the computing device, via the rule summary section of the GUI, first input indicating selection by the user of a control corresponding to a selected rule condition category of the set of rule condition categories;

generating, by the computing device, a rule conditions section of the GUI that is configured to display a set of parameters of a rule condition of the selected rule condition category in response to the input, each parameter of the set of parameters being graphically represented by a basic shape in the rules conditions section;

receiving, by the computing device, second input indicating a change in connection with the set of parameters of the rule condition; and updating, by the computing device, the rule in accordance with the change to the set of parameters of the rule condition.

2. The method of claim 1, wherein the set of parameters of the rule condition comprises at least one parameter from the selected rule condition category.

3. The method of claim 1, wherein the set of parameters of the rule condition comprises one or more parameters from different rule condition categories.

4. The method of claim 1, wherein each parameter of the set of parameters is associated with a rule condition category selected from the group of rule condition categories consisting of ad position, ad size, carrier preference, device make and model preference, geographic preference, and operating system preference.

5. The method of claim 1, wherein the set of parameters is represented as a cluster of basic shapes, and each basic shape, in the cluster of basic shapes, is connected graphically with at least one other basic shape in the cluster of basic shapes.

6. The method of claim 5, wherein each basic shape in the cluster is connected graphically with at least one other basic shape of the rule condition by being directly next to the at least one other basic shape without any other shape of the rule condition positioned between the two basic shapes.

7. The method of claim 5, wherein a position of a basic shape in the cluster is indicative of a corresponding parameter's priority relative to other parameters in the set of parameters.

8. The method of claim 7, wherein each basic shape in the cluster is individually movable to a different part of the cluster of basic shapes in the GUI, wherein the second input comprises information indicating movement of one of the basic shapes graphically representing a parameter, and wherein the movement indicates a change in priority of the parameter relative to at least one other parameter of the set of parameters.

9. The method of claim 5, wherein the basic shapes of the cluster are arranged based on relationships between parameters of the set of parameters.

10. The method of claim 1, receiving second input indicating a change to the set of parameters of the rule condition further comprising:

displaying, by the computing device, a set of selectable parameters that are each selectable to be added to the rule condition, wherein the second input indicates selection of one of the selectable parameters to be added to the rule condition.

11. The method of claim 10, further comprising:
updating, by the computing device, the rule conditions section of the GUI to include the selected parameter, wherein the selected parameter is moveable to different areas within the rule conditions section by the user interacting with the section.

12. The method of claim 1, wherein the rule condition displayed in the rule conditions section of the GUI is one of a plurality of interrelated rule conditions displayed in the rule conditions section, and an arrangement of the plurality of interrelated rule conditions in the rule conditions section of the GUI is based on their interrelationships.

13. The method of claim 1, wherein the rule conditions section of the GUI comprises an indicator of the number of rules, of the set of rules, that include the rule condition.

14. The method of claim 13, further comprising:
updating, by the computing device, each rule of the number of rules in response to third input indicative of a request to apply the condition to each of the number of rules.

15. The method of claim 13, wherein the rule conditions section of the GUI comprises a control selectable to display information indicating each rule, of the number of rules, that include the rule condition.

16. The method of claim 1, further comprising:
generating, by the computing device, a rules list section of the GUI that is configured to display at least some of the set of rules.

17. The method of claim 1, wherein an indicator displayed in the rule summary section of the GUI in connection with one of the controls indicates a number of parameters belonging to the rule condition category corresponding to the control.

18. The method of claim 1, wherein the rule includes a set of rule conditions and the rule summary section is configured to display a subset of the rule conditions in accordance with a priority associated with each rule condition.

19. A non-transitory computer-readable storage medium tangibly encoded with computer-executable instructions, that when executed by a processor associated with a computing device, performs a method, the method comprising:

generating a graphical user interface (GUI) that is configured to display, in connection with a set of rules, online advertising space inventory distribution rule information;

receiving, via the GUI, a request for a display of a rule summary section for a rule of the set of rules;

generating, in response to the request, a rule summary section of the GUI that is configured to display a summary of the rule, the rule summary section comprising a set of controls, each control corresponding to a rule condition category of a set of rule condition categories, and being selectable by a user of the GUI to navigate to a rule conditions section of the GUI to view at least one rule condition for the rule;

receiving, via the rule summary section of the GUI, first input indicating selection by the user of a control corresponding to a selected rule condition category of the set of rule condition categories;

generating a rule conditions section of the GUI that is configured to display a set of parameters of a rule condition of the selected rule condition category in response to the input, each parameter of the set of parameters being graphically represented by a basic shape in the rules conditions section;
receiving second input indicating a change in connection with the set of parameters of the rule condition; and
updating the rule in accordance with the change to the set of parameters of the rule condition.

20. A computing device comprising:
a processor; and
a non-transitory computer-readable storage medium for tangibly storing thereon program logic for execution by the processor, the program logic comprising:
  executable logic for generating a graphical user interface (GUI) that is configured to display, in connection with a set of rules, online advertising space inventory distribution rule information;
  executable logic for receiving, via the GUI, a request for a display of a rule summary section for a rule of the set of rules;
  executable logic for generating, in response to the request, a rule summary section of the GUI that is configured to display a summary of the rule, the rule summary section comprising a set of controls, each control corresponding to a rule condition category of a set of rule condition categories, and being selectable by a user of the GUI to navigate to a rule conditions section of the GUI to view at least one rule condition for the rule;
  executable logic for receiving, via the rule summary section of the GUI, first input indicating selection by the user of a control corresponding to a selected rule condition category of the set of rule condition categories;
  executable logic for generating a rule conditions section of the GUI that is configured to display a set of parameters of a rule condition of the selected rule condition category in response to the input, each parameter of the set of parameters being graphically represented by a basic shape in the rules conditions section;
  executable logic for receiving second input indicating a change in connection with the set of parameters of the rule condition; and
  executable logic for updating the rule in accordance with the change to the set of parameters of the rule condition.

* * * * *